March 10, 1931. H. M. CLARK 1,795,710
GRILL STOVE
Filed Feb. 10, 1930
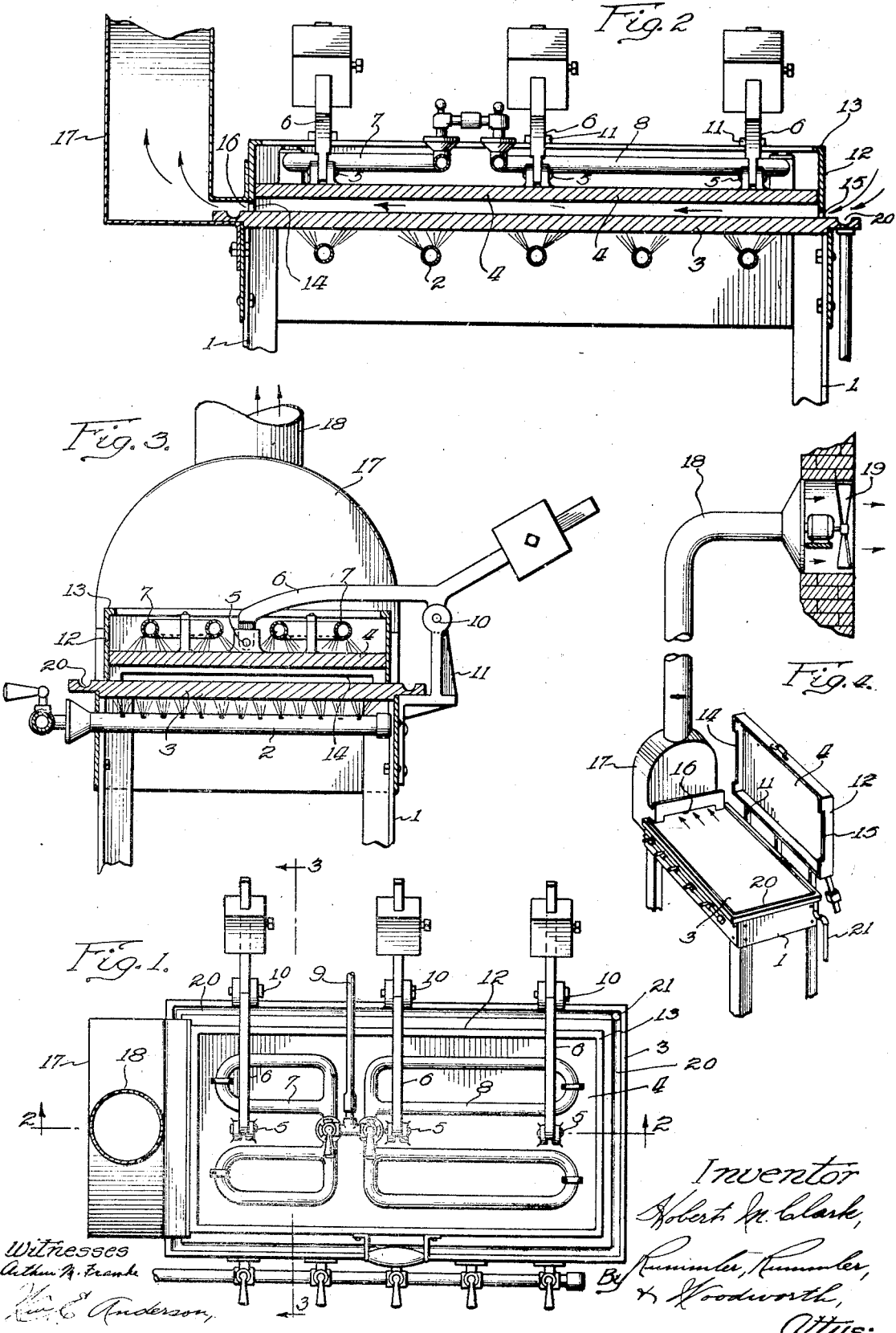

Patented Mar. 10, 1931

1,795,710

UNITED STATES PATENT OFFICE

HOBERT M. CLARK, OF CHICAGO, ILLINOIS

GRILL STOVE

Application filed February 10, 1930. Serial No. 427,244.

This invention relates to griddle stoves of the type in which two griddle plates are used for applying heat simultaneously to both sides of the meat or other food product.

An object of the invention is to provide structural improvements in the class of griddles to which this invention relates to bring about better operating conditions by insuring against the escape of fumes around the grill. With this end in view, it is also a purpose of the invention to provide an improved relationship between the upper griddle plate and its housing to properly allow for varying thickness of the articles which are broiled.

The objects of the invention are accomplished by an arrangement as illustrated in the drawings in which:—

Figure 1 is a plan view of the grill with the housing for the upper griddle plate removed.

Fig. 2 is a longitudinal sectional view taken on the line 2—2 of Fig. 1.

Fig. 3 is a transverse sectional view taken on the line 3—3 of Fig. 1.

Fig. 4 is a perspective view partly broken away to illustrate the general arrangement of the grill and draft-creating means.

It is common practice in connection with grills, which are used in restaurants, to provide an overhead hood structure to draw fumes from the grill upwardly through an open space. Such is not an entirely satisfactory arrangement because the heated moisture and smoke-laden atmosphere are annoying to the attendants and is generally not wholly caught by the outlet hoods.

The drawing accompanying this application for patent shows a grill and means for drawing a draft toward and into the grill. The fume-laden air passes through an outlet in a flue structure closely associated with the grill at one end thereof. A cover for the movable grill serves to localize the inward drafts to effective points and otherwise provide a surrounding seal for the space between the upper and lower plates and still allow for the plates contacting with the opposite surface of the articles therebetween, even though these may vary considerably in thickness.

The grill illustrated in the drawings comprises a table-like structure 1 supporting heating means, such as the gas burner 2, and the fixed lower griddle plate 3. The upper plate 4 is hinged at 5 on a longitudinal line above its center to a plurality of counterbalanced supporting arms 6. The gas burners 7 and 8, mounted upon the top of plate 4, receive gas through a flexible connection 9 which does not interfere with the movement of the plate around its pivots 9 and the pivots 10 for the supporting arms 6. The pivots 10 are at the upper ends of fixed brackets 11 which are bolted to the back of the table 1.

The housing 12 for the upper plate is rectangular, according to the shape of plate 4, providing surrounding walls which are inwardly flanged at 13, so that the housing will be engaged at this point by the edges of plate 4 when the plate is swung upwardly away from plate 3. The end walls of the housing 12 are cut away at 14 and 15. When the housing bears against the upper flat surface of plate 3, the cut 14 registers with an opening 16, in the fume outlet hood 17, and the cut 15 allows for an inward draft at the opposite end of the grill. The hood 17 is bolted to the end of the table 1, as shown in Figure 2. The outlet flue 18 for the hood 17 communicates with draft creating means, such as the fan 19 shown in Figure 4. The lower plate is provided with a grease-collecting channel 20 along the edge of the upper surface thereof which serves to conduct grease into the outlet conduit 21.

In the operation of the grill, when the upper section is allowed to move downwardly against an article placed upon the lower plate 3, its housing or casing 12 moves with it until the edges of this housing contact with the surface of the lower plate and further movement downwardly of the upper plate 4 is, therefore, relative to its housing. Upon the return upward movement of plate 4, the housing is lifted when the edges of the plate engage flanges 13.

I claim:

1. A grill comprising a fixed base plate and heating means therefor, an upper plate and housing therefor, heating means in said housing, the upper plate being mounted in hinged relation to the lower plate, a fume-carrying hood secured to one end of the fixed plate and provided with an opening communicating with the space between said plates, the housing of the upper plate being formed to provide a seal with the lower plate and around said opening when in its closed position, means for drawing a draft into said opening and through the hood, and an outlet flue communicating with said hood.

2. In a grill of the class described, upper and lower griddle plates mounted to provide for movement of one of the plates toward and away from the other, means for heating the plates, a housing for the upper plate adapted to form a seal with the lower plate by resting thereon, said upper plate being arranged with its housing for relative movement therewith, so that it may have a greater movement toward and away from the lower plate than the housing.

3. In a grill of the class described, upper and lower griddle plates mounted to provide for movement of one of the plates toward and away from the other, means for heating the plates, a housing for the upper plate adapted to form a seal with the lower plate by resting thereon, said upper plate being arranged with its housing for relative movement therewith, so that it may have a greater movement toward and away from the lower plate than the housing, and a hood for carrying away fumes, said hood being mounted at one end of the lower plate and having an opening communicating with the space between the plates.

Signed at Chicago this 7th day of February, 1930.

HOBERT M. CLARK.